(12) United States Patent
Klootz

(10) Patent No.: US 7,134,763 B2
(45) Date of Patent: Nov. 14, 2006

(54) ILLUMINATION FOR COAXIAL VARIABLE SPOT HEADLIGHT

(76) Inventor: Jack Klootz, 6005 Pinnacle La., #402, Naples, FL (US) 34110

( * ) Notice: Subject to any disclaimer, the term of this patent is extended or adjusted under 35 U.S.C. 154(b) by 0 days.

(21) Appl. No.: 10/711,006

(22) Filed: Aug. 17, 2004

(65) Prior Publication Data

US 2006/0039134 A1    Feb. 23, 2006

(51) Int. Cl.
*F21V 99/00* (2006.01)
(52) U.S. Cl. ............ 362/105; 362/804; 362/555; 362/572; 362/554
(58) Field of Classification Search ........... 362/105, 362/106, 268, 804, 799, 572, 573, 554, 800, 362/581, 552, 570, 103, 555; 385/88, 92–94, 385/147, 901; 600/249, 248
See application file for complete search history.

(56) References Cited

U.S. PATENT DOCUMENTS

| 2,893,379 | A | * | 7/1959 | Springer ............... 600/184 |
| 3,461,346 | A | * | 8/1969 | Lilly .................... 315/276 |
| 4,104,709 | A | * | 8/1978 | Kloots .................. 362/105 |
| 4,516,190 | A | | 5/1985 | Kloots |
| 4,599,537 | A | * | 7/1986 | Yamashita ............ 313/501 |
| 4,616,257 | A | | 10/1986 | Kloots et al. |
| 4,897,772 | A | * | 1/1990 | Ibusuki et al. ......... 362/282 |
| 5,003,434 | A | * | 3/1991 | Gonser et al. ......... 362/572 |
| 5,163,420 | A | | 11/1992 | Van Der Bel |
| 5,732,176 | A | * | 3/1998 | Savage, Jr. ............ 385/92 |
| 5,774,271 | A | * | 6/1998 | Lagerway et al. ..... 359/649 |
| 6,290,368 | B1 | * | 9/2001 | Lehrer .................. 362/187 |
| 6,390,640 | B1 | * | 5/2002 | Wong et al. .......... 362/105 |
| 6,604,847 | B1 | * | 8/2003 | Lehrer .................. 362/572 |

* cited by examiner

*Primary Examiner*—Sandra O'Shea
*Assistant Examiner*—Sharon Payne
(74) *Attorney, Agent, or Firm*—Malin, Haley & DiMaggio, P.A.

(57) ABSTRACT

A surgical headlight that includes a small housing containing an LED white light source and light transmission elements including a fiber optic rod and lenses. The headlight housing is attached to a device worn by a surgeon. The LED provides a high intensity, light weight light source that can be varied in intensity through the power supply. Using the present invention, a very high intense illumination source of white light is achieved in a small housing for illuminating a surgical area.

6 Claims, 4 Drawing Sheets

ILLUMINATION FOR COAXIAL VARIABLE SPOT HEADLIGHT

BACKGROUND OF INVENTION

1. Field of the Invention

This invention relates to a surgical headlight that provides illumination to a surgeon"s area of work and, specifically, to an improved surgical headlight that has improved illumination mounted in the headlight device itself in the form of a LED illuminator.

2. Description of Related Art

The use of surgical headlights is well known to provide illumination to a surgical area in which the headlight is mounted on the surgeon"s head. Because of the head mounting, it is desirable to have a very light weight unit for the comfort of the surgeon while, at the same time, it is imperative that high light intensity be provided for the illumination of the surgical area being worked on.

U.S. Pat. No. 4,616,257 issued to Kloots, et al. on Oct. 7, 1986 shows a head mounting illuminating apparatus that includes video and audio transmittal component. This patent uses a fiber optic cable to provide light to an illumination lens.

U.S. Pat. No. 4,516,190 issued to Kloots on May 7, 1985 describes a surgical head lamp that is removably mounted to a head band that uses a remote light source transmitted by a fiber cable. With the advent of fiber optics, it is common to supply light via a fiber optic cable to a module which houses an illumination lens that allows the light passing through the lens that forms a beam to illuminate the surgeon"s entire work area.

U.S. Pat. No. 5,163,420 issued to Van Der Bel on Nov. 17, 1992 shows a headlight system that utilizes light from the fiber optic conduit that is directed into a housing along a horizontal axis.

Although many of the headlights shown in the prior art operate sufficiently to illuminate the surgical work area, it is desirable to provide a light source of high intensity while, at the same time, having a comfortable light weight headlight housing for the comfort of the surgeon. Furthermore, it is desirable to have a light source exhibiting a long life, energy efficiency, durability, low maintenance cost and compact size.

The present invention accomplishes the above by using a high intensity, small, powerful LED (light emitting diode) as the light source which can be mounted directly in a light housing mounted on the head of the surgeon.

SUMMARY OF INVENTION

A surgical headlight for providing illumination of high intensity to the surgical work area that is mounted directly on the head band of the surgeon comprising a light housing that includes an LED light source, an optics transmission system and a variable directory light focus system all connected in the housing. The LED light source is connected by a cable to a power supply that supplies electrical power to the LED light source through a variable power controller. A power on/off switch is also connected to the light source and the power supply for varying the intensity of the light source. The cable that connects the power supply to the light housing can be plugged into and out of the power source and the light housing.

The LED light source is mounted inside and near one end of the light housing (proximal end) and includes an electrical, detachable coupling from the power source supply cable. Adjacent the LED is a fiber optic rod that abuts the LED light emanating surface, forming a direct light channel from the LED light source. The end of the fiber optic rod that emits light is in optical communication with a pair of collimating lenses that are back to back in a channel to collimate the light beam received from the fiber optic rod. The distal end of the headlight housing includes a mirror that is in optical communication with the collimating lenses and a movable light housing section that allows the entire end portion of the headlight housing that emits light to be manually moved up, down and sideways by a joy stick. A final lens optically spreads the light out that is transmitted to the surgical area.

The LED light source is a white color light temperature 5500 Kelvin daylight lumens 60–80.

The system uses a detachable push/pull locking cable assembly that provides electrical power 12 volt DC supplying a thousand milliamps to the electrical contacts of the LED. The power cable assembly can be detached by push/pull couplings at each end, one end being attached to the power source box that provides the electrical current to the LED and the other end to the optical headlight housing.

The LED is mounted on a circuit board and a heat sink and is soldered in two places to the circuit board. The detachable cable has a pair of contacts that fit directly into the headlight housing and connect directly to the LED soldered leads.

The initial AC electrical power source can include a power cord that connects to hospital or doctor office outlet approved 100–250 volt AC 50–60 Hz power. The LED is powered by low voltage DC. The current amplitude can be varied to vary the intensity of the LED emissions. The low voltage DC power is generated in a small circuit box having a step down transformer. Current is varied with a rheostat. The DC power supply for providing electrical power to the LED is a small supply box that includes a cable coupling receptacle plug for the LED cable and an on/off switch that may include a variable intensity control for changing the amount of light radiated by the LED by changing the current and voltage to the light. The power supply box includes control circuits that convert AC electrical power to a DC 12 volt 1000 milliamps supply that can be varied through ae rheostat type variable intensity control that is connected to the electrical cable with the power box.

Because of its small size, the LED light source is mounted within the light housing that is attached to a band or cap on the surgeon"s head. The use of high efficiency optical transmission lenses, a fiber optic cable, and a compact high intensity light source of white light is available to the surgeon.

It is an object of this invention to provide a light weight high intensity light such as an LED as the light source for a surgeon"s headlight in which the housing and the light source are mounted on the surgeon"s head.

Another object of this invention is to provide a high intensity LED light source that is mounted directly in the light housing and that is attached by or detachable power cable to a variable power supply for varying the intensity of the light which is mounted on a headlight arrangement for a surgeon for illuminating a surgical area.

In accordance with these and other objects which will become apparent hereinafter, the instant invention will now be described with particular reference to the accompanying drawings.

DETAILED DESCRIPTION

Figure 1:
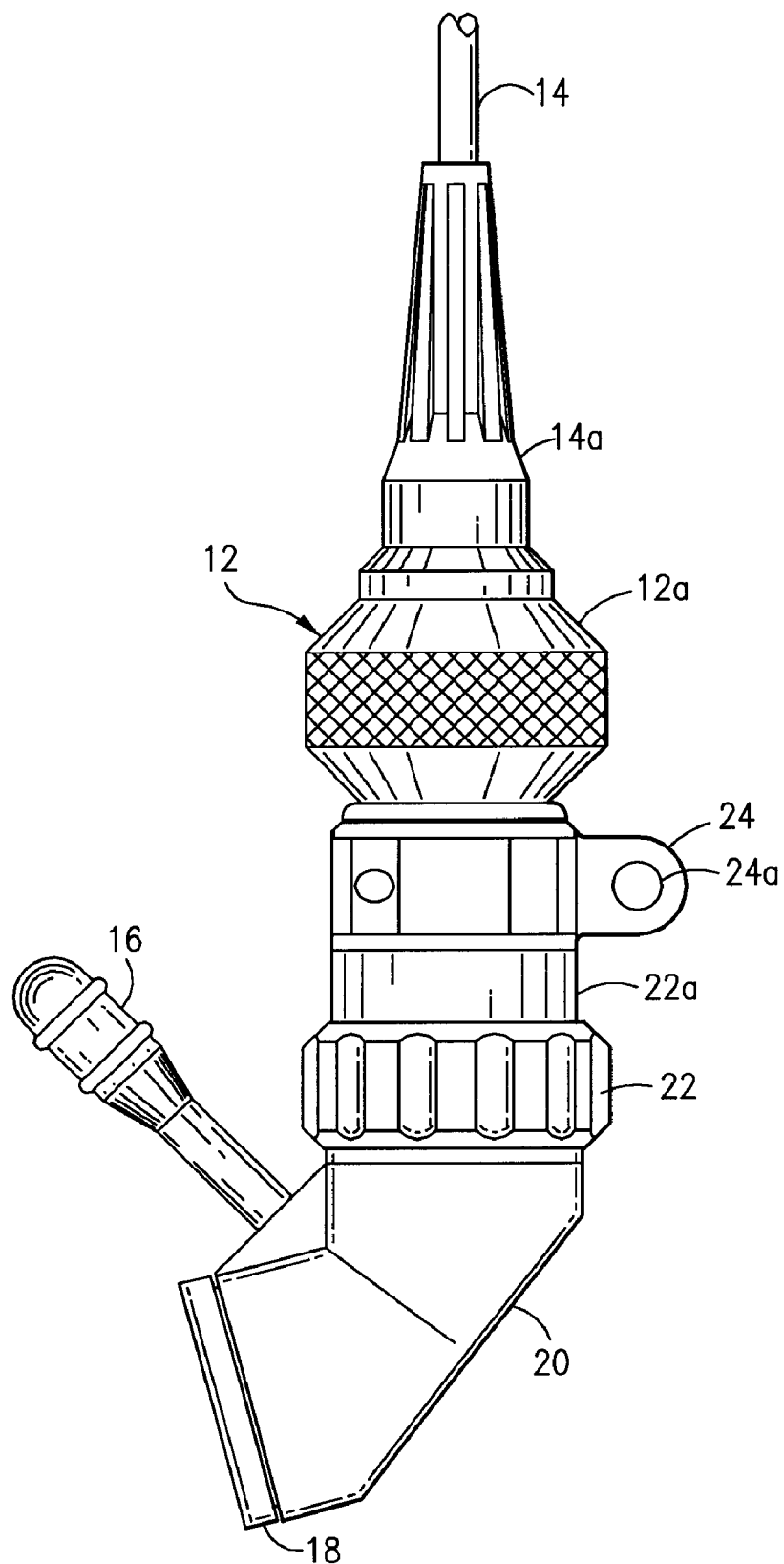
FIG. 1 shows a side elevational view of the light housing used in the present invention.
Figures 2, 3:
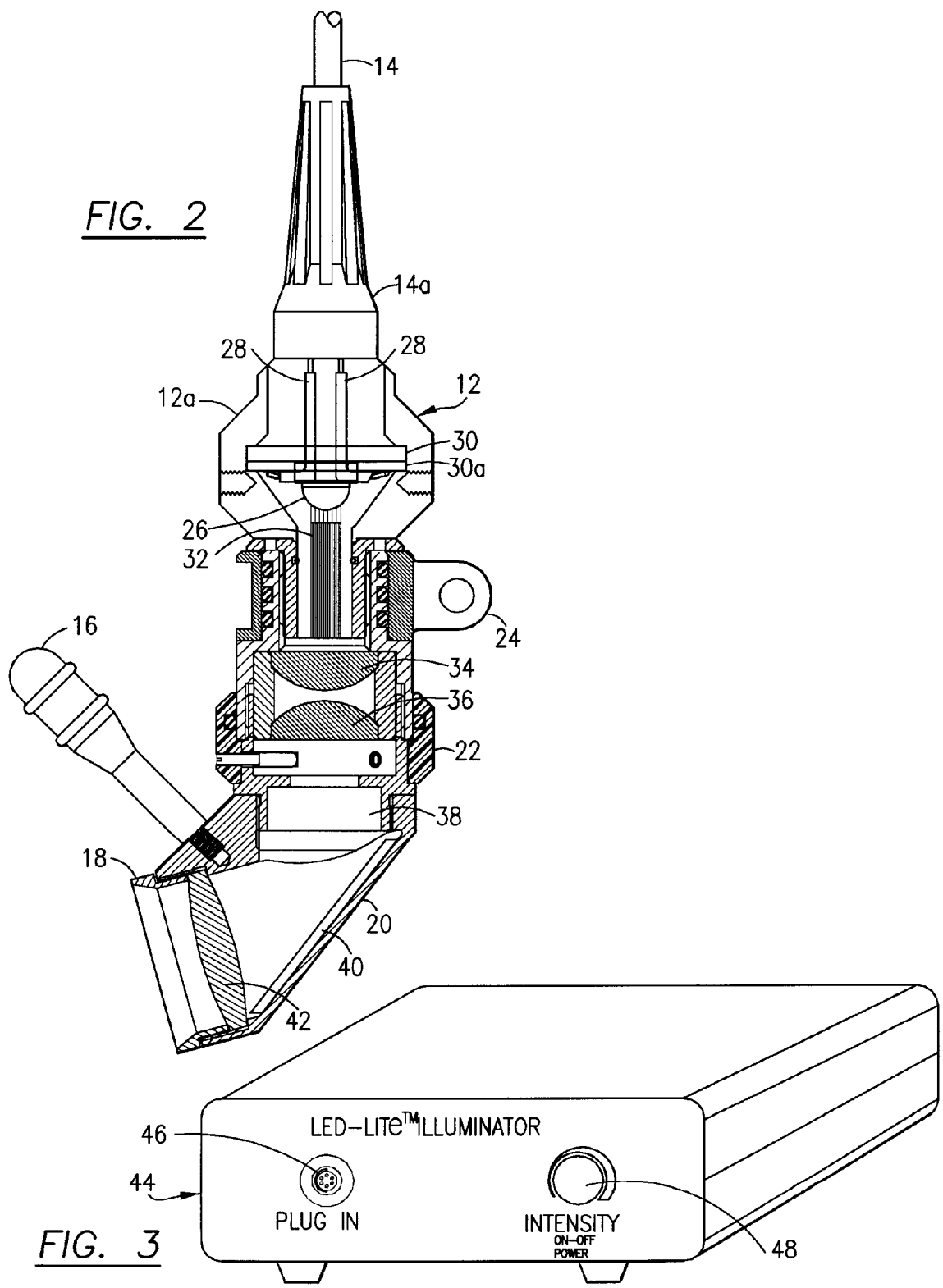
FIG. 2 shows a side elevational view in cross section of the light housing for the headlight used in the present invention.
FIG. 3 shows a perspective view of the power source box used in the present invention.

Referring now to FIG. 1 and FIG. 2, a headlight housing 12 is shown that is connected to a power source cable 14 by a push/pull coupler plug 14a. The housing 12 also has a joy stick 16 attached thereto in the front of the headlight housing that allows the surgeon to manually adjust the direction of light emanating from opening 18 in the headlight housing 12. Inside an angled housing section 20 is a mirror 40 for directing the light from LED 26 through the opening 18. An annular housing connector 22 connects the angled section housing 20 to the power source cable 14, preferably through attachment to a barrel section 22a. A connector ring 24 connected to the housing 12 is pivotally attachable through aperture 24a to a head band or cap (not shown) worn by the surgeon. The connector ring 24 and aperture 24a also allows the assembly 12 to be manually pivoted vertically. The housing section 12a is light proof and has the light source (LED) mounted therein.

In FIG. 2, an LED 26 in housing section 12a is soldered to electrodes on circuit board 30 which has a pair of electrical connectors 28 that electrically connect to the detachable power source cable 14 that itself is attached to a DC power source not shown in FIG. 2. The top of the LED 26 is physically abutted next to a fiber optic rod 32 so that a large portion of the light illuminated and radiated from the LED 26 is transmitted directly through the proximal end of fiber optic rod 32. Said fiber optic rod 32 is preferably comprised of a bundle or bundles of a plurality of fiber optic strands. The hemispherical concave shape of the proximal end of the fiber optic rod 32 that covers the surface of LED 26 is preferred so that each fiber optic strand can transmit the maximum amount of light from LED 26 to the distal opening 18. The housing 12 also includes a pair of collimating optical lenses 34 and 36 which are in direct optical communication with the distal end and output of fiber optic rod 32. Lens 34 is in direct physical contact with the distal end and output of said fiber optic rod 32, which abuts against said lens 34 as illustrated in FIG. 2. The lenses 34 and 36 also have an optical channel 38 having output so that the light once, collimated by the lenses 34 and 36, is then received into the optical channel 38 and directed towards a mirror 40. The light is reflected from mirror 40 through an output lens 42 and then out of the housing 12 through opening 18.

The electrical power that is supplied to the LED light 26 is preferred to be a 12 volt DC 1000 milliamps that is variable with a rheostat to change the intensity output of the LED. The LED is preferred to provide white light at temperature 5500 degrees Kelvin and is 60–80 lumens in intensity that can be varied by varying the power source. However, other LED light sources known in the art are also contemplated.

FIG. 3 shows a power supply box 44 that includes the circuitry necessary to receive AC current between 90264 Vac at 47–63 Hz and transform the AC voltage into 12 volt DC 1000 milliamps. The power supply box 44 for the power source includes a receptacle 46 for the detachable power cable 14 and preferably includes a variable current intensity control and power on/off switch 48. Rotating switch 48 can vary the DC current to the LED to vary light intensity.

Figure 4:
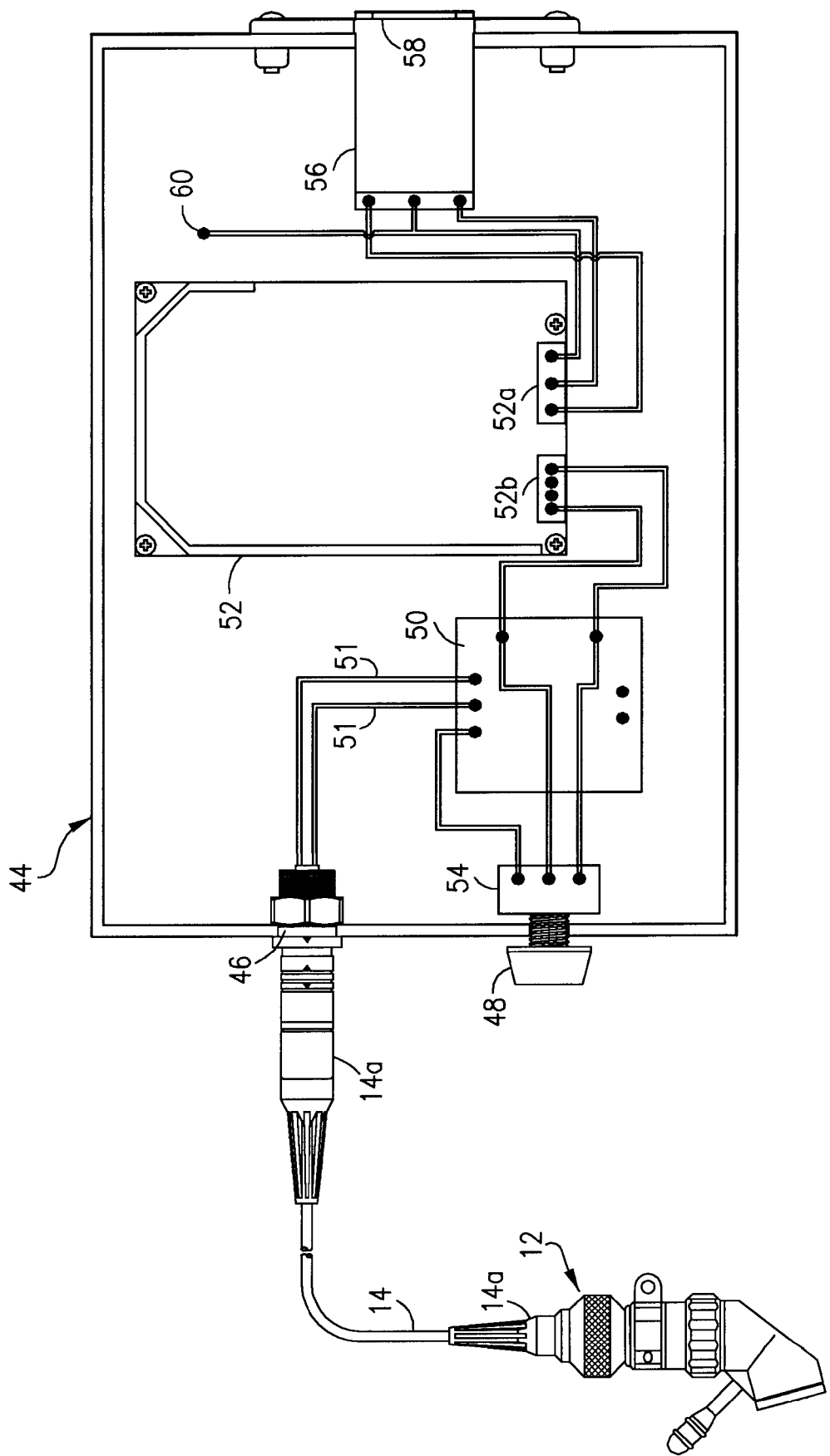
FIG. 4 shows a side elevational view of the light housing and a schematic diagram of the power source circuit mounted in the power supply box in the present invention.

Referring now to FIG. 4, the DC power source is shown schematically in a box 44 that includes a rheostat 54 and a circuit card 50 that receives power from a transformer 52 and a conventional power outlet having AC power. Switch 48 can be turned on and off and also rotated to vary the intensity of current received through power source cable 14 to the light housing 12 and, specifically, to LED 26 shown in FIG. 2. An AC power entry module 56 has a three prong receptacle 58 that receives a plug (not shown) that connects to a conventional 100–250 VAC electrical supply. Element 60 represents ground. High AC voltage is transferred to input 52a in transformer 52. The lower DC voltage is sent to circuit board 50 and rheostat 54 from output 52b. Conductors 51 connected to circuit board 50 supply DC power to the light housing 12 through plug 46 and power cable 14.

Figure 5:
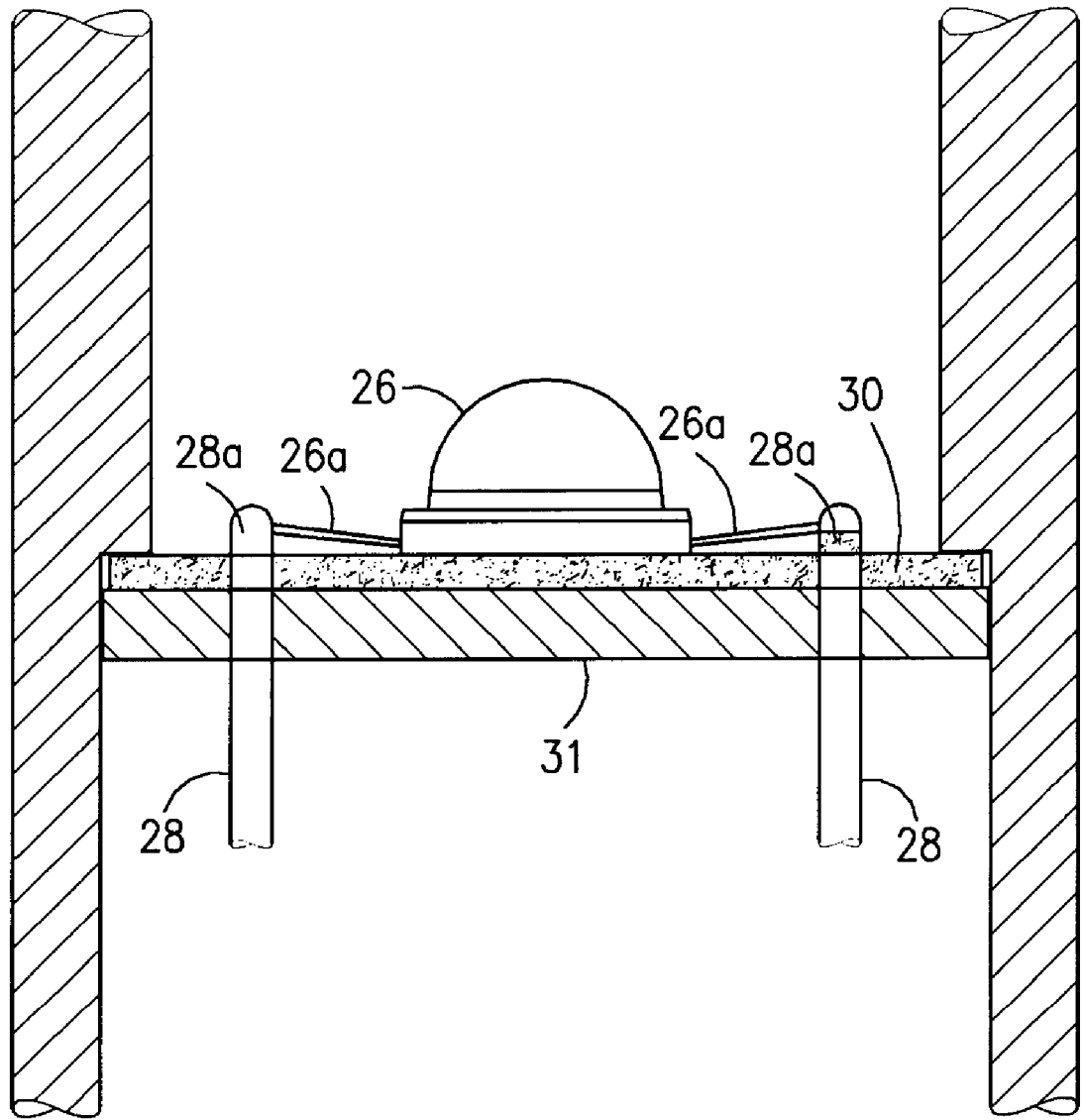
FIG. 5 shows a side elevational view partially in cross section of the LED light source used in the present invention.

Referring now to FIG. 5, the LED 26 is shown mounted on a circuit board 30 and heat sink 31. The LED electrodes 26a are soldered at 28a to the electrical wiring connectors 28 which connect to the power source cable 14.

In operation, the on/off switch 48 is turned on to provide power to the LED in the headlight housing 12. The headlight housing 12 is attached through connector ring 24 to a head band or hat worn by the surgeon. Once the LED is illuminated, the surgeon can vary the illumination intensity from LED 26. Referring back to FIG. 2, the light caused by illuminating LED 26 is transmitted through the fiber optic rod 32 through the lenses 34 and 36 reflected off mirror 40 and directed through output lens 42. The intensity can be varied. By using such a light weight but high intensity light source, the LED can be mounted in the headlight directly for use for illuminating the surgical area.

The instant invention has been shown and described herein in what is considered to be the most practical and preferred embodiment. It is recognized, however, that departures may be made therefrom within the scope of the invention and that obvious modifications will occur to a person skilled in the art.

What is claimed is:

1. A surgical headlight system attachable to a surgeon's head band or cap for illumination purposes comprising:
   a headlight housing, said headlight housing including at least one LED light source and a fiber optic rod disposed directly adjacent to and abutting against said LED light source;
   a lens assembly in direct optical communication with the output of said fiber optic rod;
   a light path from said lens assembly in said headlight housing to emit light outside said headlight housing to a surgical area;
   an electrical power source that is variable for providing power to said LED light source connected to said LED light source;
   said fiber optic rod comprising a bundle or bundles of a plurality of fiber optic strands;
   said fiber optic rod including:

a distal end serving as an output of light from the LED light source; and a proximal end that is a hemispherical concave shape.

2. A surgical headlight system attachable to a surgeon's head band or cap for illumination purposes comprising:

a headlight housing, said headlight housing including at least one LED light source and a fiber optic rod disposed directly adjacent to and abutting against said LED light source;

a lens assembly in direct optical communication with the output of said fiber optic rod;

a light path from said lens assembly in said headlight housing to emit light outside said headlight housing to a surgical area;

an electrical power source that is variable for providing power to said LED light source connected to said LED light source;

said lens assembly comprising a first collimating lens and a second collimating lens; and the first collimating lens being in direct physical contact with a distal end and output of said fiber optic rod so that the distal end of said fiber optic rod abuts against said first collimating lens.

3. A surgical headlight system attachable to a surgeon's head band or cap for illumination purposes comprising:

a headlight housing, said headlight housing including at least one LED light source and a fiber optic rod disposed directly adjacent to and abutting against said LED light source;

a lens assembly in direct optical communication with the output of said fiber optic rod;

a light path from said lens assembly in said headlight housing to emit light outside said headlight housing to a surgical area;

an electrical power source that is variable for providing power to said LED light source connected to said LED light source;

said fiber optic rod comprising a bundle or bundles of a plurality of fiber optic strands;

said fiber rod comprising a distal end serving as an output of light from the LED light source;

a proximal end that is a hemispherical concave shape; and the hemispherical concave shape of a proximal end of the fiber optic rod covering the surface of the LED light source so that each fiber optic strand can transmit the maximum amount of light from said LED to a distal opening of the headlight housing.

4. A compact headlight for surgery comprising:

a housing with an opening for emitting light;

an LED light source in direct physical contact with and abutting against a fiber optic rod that forms a direct light optical channel;

a pair of collimating lenses in direct optical communication with said fiber optic rod;

wherein said LED light source, the pair of collimating lenses, and the fiber optic rod are all self-contained in said small housing;

a power source that is connected to the LED light source to provide power to said LED light source;

said fiber optic rod comprising a bundle or bundles of a plurality of fiber optic strands;

said fiber optic rod including:

a distal end serving as an output of light from the LED light source; and a proximal end that is a hemispherical concave shape.

5. The surgical headlight assembly as in claim 4, wherein the hemispherical concave shape of the proximal end of the fiber optic rod covers the surface of the LED light source so that each fiber optic strand can transmit the maximum amount of light from said LED to a distal opening of the lightweight housing.

6. A compact headlight for surgery comprising:

a housing with an opening for emitting light;

an LED light source in direct physical contact with and abutting against a fiber optic rod that forms a direct light optical channel;

a pair of collimating lenses in direct optical communication with said fiber optic rod;

wherein said LED light source, the pair of collimating lenses, and the fiber optic rod are all self-contained in said small housing;

a power source that is connected to the LED light source to provide power to said LED light source; and the first collimating lens being in direct physical contact with the distal end and output of said fiber optic rod so that the distal end of said fiber optic rod abuts against one side of said first collimating lens.

* * * * *